Nov. 5, 1946.    W. H. GLAZER    2,410,729
OPHTHALMIC TEST DEVICE
Filed March 13, 1943

INVENTOR.
William H. Glazer
BY
Harry Langsam

UNITED STATES PATENT OFFICE 2,410,729

OPHTHALMIC TEST DEVICE

William H. Glazer, Philadelphia, Pa.

Application March 13, 1943, Serial No. 479,083

1 Claim. (Cl. 88—20)

My invention relates to a binocular ophthalmic test frame for the human eyes.

Binocular devices, intended to correct ocular defects, may be seriously affected, or entirely fail of its purpose, when eyes have to utilize eccentric portions of each lens, as when looking into the so-called bifocal zone, because:

1. Few faces are truly symmetrical.
2. Each eye may be displaced horizontally an unequal amount from the middle line of the nose; or, vertically, an unequal amount; or both; as to a pathology.
3. Although apparently symmetrical, each eye may rotate an unequal amount downward or upward due to a difference in the centers of rotation.

It is another object of my invention to place a block on the scale and to use the elevating gear on the trial or test frame to enable one to detect and measure the amount, and any difference of motion of a pair of eyes about their centers of rotation.

It is an object of my invention to provide a pair of scales to overcome these difficulties so as to assure the maximum of eye comfort and protection by the use of correctly centered ophthalmic lens systems.

Another object of my invention is to construct an improved device of the character described which is readily and economically produced, that is sturdy in construction, and which has a maximum degree of efficiency in operation.

With the above and related objects in view, my invention consists in the details of construction and combination of parts, as will be more fully understood from the following description when read in conjunction with the accompanying drawing, in which.

Figure 1:
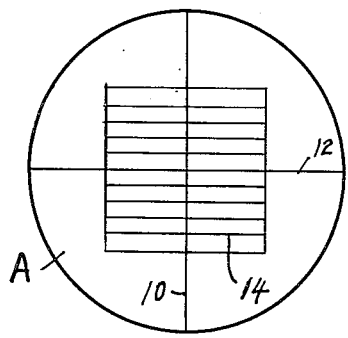
Fig. 1 is a front view of disc having two mutually perpendicular center lines and a plurality of horizontal lines above and below the horizontal center line adapted for the right eye.
Figure 2:
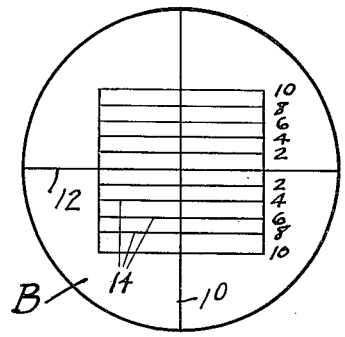
Fig. 2 is a front view of a disc similar in construction to Fig. 1 but adapted for the left eye.
Figure 3:
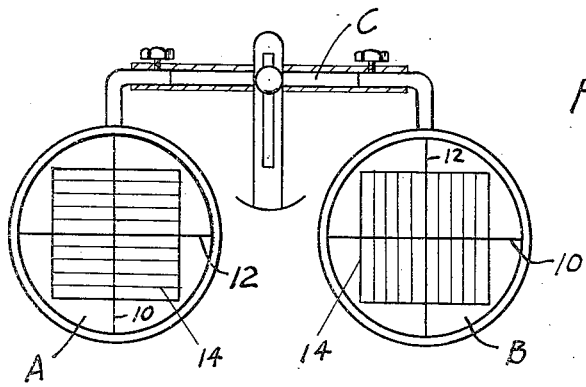
Fig. 3 is a front view of the right eye and left eye discs in a trial frame.

A scale is placed on a right eye disc generally designated as A and a left eye disc generally designated as B and the scale comprises two mutually perpendicular lines 10 and 12 that coincide with the principal diameters of each circular transparent disc. Five parallel lines 14 are drawn above and parallel to one principal diameter, which is the zero of the scale, or grid 14 and five parallel or grid lines 16 are drawn below the zero line, at two millimeter intervals giving a range of ten millimeters above, and ten millimeters below the zero line. At the extremity of each line is a number corresponding to each two millimeters displacement.

Each of the discs A and B are placed in a cell of a regular test or trial frame designated as C. Each cell may be moved in a horizontal plane and independently of the other. Thereby, the vertical diameter 10 may be set so as to be tangent to the inner margin of the pupil, practicing the common method of avoiding parallax. A distance reading is taken from the center of the trial frame C to the aforementioned line 10; then the vertical diameter 10 of the disc is displaced tangent to the outer edge of the eye pupil, and a second reading from the new position of the disc to the center of the trial frame is taken. The horizontal width of the pupil is obtained by subtracting one reading from the other, and the distance from the nose to the center of the pupil is the mean distance of the two readings.

The vertical pupillary width is similarly had, and the relative difference in height, should any occur, is read directly on the spaced scale lines.

It is pointed out here that the horizontal measurements may be had without utilizing the frame's cell displacement gear merely by rotating the disc into a vertical position. All that is necessary in this operation is to set both discs uniformly at some given distance apart, for example 30 or 35 millimeters; then take the readings to the pupillary edges to which the scale lines are tangent.

In ordinary centration, one may directly set the intersection of the principal diameters of the scales at the center of the pupillary area with a surprisingly good degree of accuracy. Both horizontal and vertical displacements are thus perhaps most quickly achieved. This method supposes that the refinements suggested above may not be desired in each case. Finally, with the scale lines horizontal and in their true setting, the patient's attention is directed to a single letter or symbol. Then, occluding or covering one eye, a small opaque straight edge is carried parallel to the grid lines until the object viewed is at the black-out point. The ocular rotation or penetration point through each lens is directly determined on the scale. In the event that penetration is below the last line, a new zero is had by displacing the frame cells downward a number of lines. As a matter of practice, this displacement is recommended in order to take several readings which should closely approximate each other.

Similarly, the same kind of information may be elicited for zones above the horizon. It seems quite within the realm of probability that these data may uncover unsuspected pathology, supporting the necessity for having these important records.

It should be quite obvious that the best results must come only after practice and experience with these scales, resulting in a routine of clinical method and observation. Doubtless, each refractionist will have his own individual preference of method or procedure in due course.

Figure 4:
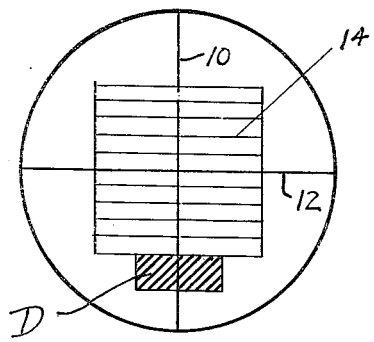
Fig. 4 is a modification of a disc having a solid horizontal block below the lowermost horizontal line.

A further simplification of this procedure shown in Fig. 4 for determining the ocular rotation or penetration point through each lens is had by adding to the scale a solid block, generally designated as D, tangent to the last line of the scale. This opaque block D is about 16 mm. in length by 5 mm. in width, bisected by the principal vertical diameter 12.

The opaque rectangular block D is located beneath the lowermost horizontal line 14 to enable one to detect and measure the amount and any difference of motion of a pair of eyes about their centers of rotation, either in a horizontal or a vertical direction. Hence, where each eye is displaced horizontally or vertically an unequal amount from the middle line of the nose, and where each eye may rotate an unequal distance either downward or upward due to the difference of rotation, one may readily determine these quantitative differences by the block on the disc when in the test frame. After the defect of the eye is determined by my invention, then the prescription for the glasses may be corrected.

The method for determining the ocular rotation or penetration point through each lens, as for achieving a reading point (so-called bifocal center), is had by placing the scales into the trial frame cells, setting the intersection of the principal diameters coincident with the center of the pupils, the head being in its natural erect position, and the gaze to the horizon.

Then, occluding one scale, the patient's attention is directed towards a single letter or symbol, as if performing a normal act of reading through the disc A, hence the eye of the patient is turned downwardly. The elevating gear of the trial frame C is then moved until the opaque block on the scale just obliterates (blacks out) the object viewed. The elevating gear is then locked, and the patient is directed to return head and gaze to the erect normal posture. The amount of displacement of the principal horizontal diameter from the new horizontal bisector of the pupil is directly read on the scale, and gives the amount of ocular rotation and penetration point in the plane of the scale, or the plane in which the correction lenses will fall. This operation is repeated for the other eye, occluding the eye just examined.

In like manner, this procedure may be had for some point above the horizon. By rotating the scale or grid, with the lines vertical instead of horizontal, the same information may be elicited for points in the horizontal plane, the opaque block of the scale, of course, being placed in the visual field examined.

Although my invention has been described in considerable detail, such description is intended as illustrative rather than limiting, since the invention may be variously embodied and the scope of the invention is to be determined as claimed.

I claim as my invention:

An ophthalmic test instrument comprising a test frame, said test frame having a vertically and horizontally movable disc holder for each eye, a pair of flat transparent discs mounted in said disc holders, each disc having thereon mutually perpendicular lines extending vertically and horizontally through the center of the disc, a plurality of spaced horizontally extending lines parallel to one center line, and an opaque block symmetrically positioned to each side of the vertical diameter and beneath and tangent to the lowermost horizontal line for the purpose of determining any inequality of position and motion of a pair of eyes.

WILLIAM H. GLAZER.